United States Patent
Hickie et al.

(10) Patent No.: US 12,436,830 B2
(45) Date of Patent: Oct. 7, 2025

(54) INTELLIGENT MESSAGE LOSS DETECTION AND REMEDIATION IN A MICROSERVICES ARCHITECTURE

(71) Applicant: Dell Products L.P., Round Rock, TX (US)

(72) Inventors: John Hickie, Dublin (IE); Som Shankar Sahoo, Bangalore (IN); Manav Ghosh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 61 days.

(21) Appl. No.: 18/323,573

(22) Filed: May 25, 2023

(65) Prior Publication Data

US 2024/0394132 A1 Nov. 28, 2024

(51) Int. Cl.
*G06F 11/00* (2006.01)
*G06F 11/07* (2006.01)

(52) U.S. Cl.
CPC ........ *G06F 11/076* (2013.01); *G06F 11/0709* (2013.01); *G06F 11/0793* (2013.01)

(58) Field of Classification Search
CPC . G06F 11/076; G06F 11/0709; G06F 11/0793
See application file for complete search history.

(56) References Cited

U.S. PATENT DOCUMENTS

| | | | |
|---|---|---|---|
| 2014/0189442 A1* | 7/2014 | DeGraaf | H04L 51/212 714/48 |
| 2016/0077910 A1* | 3/2016 | Dev | G06F 11/0742 714/4.3 |

* cited by examiner

*Primary Examiner* — Katherine Lin
(74) *Attorney, Agent, or Firm* — DALY, CROWLEY, MOFFORD & DURKEE, LLP

(57) ABSTRACT

An example methodology may be executed by a sidecar proxy attached to a microservice. The method includes intercepting an outgoing request message from the microservice, saving the request message to a first database, and initiating a timer specifying a predetermined time for retrying the request message. The method also includes, responsive to a determination that the timer expired, incrementing a current attempt count for the request message, wherein the current attempt count being a count of retries of the request message, and responsive to a determination that the current attempt exceeds a maximum retry attempts permitted for the request message, saving the request message to a second database. The method also includes, responsive to a determination that the current attempt count does not exceed the maximum retry attempts permitted, retrieving the request message from the first database, retrying the request message, and initiating the timer for the request message.

17 Claims, 8 Drawing Sheets

In-Memory Database Record 600

- Request_Id

- Target_Uri

- Message_Payload

- HTTP_Method

- Max_Attempts

- Current_Attempt

- Status

- Purge

FIG. 6

IMLD Settings Data Structure 700

- Enable/Disable Pod

- Enable/Disable Namespace

- DNS Entry

- Listener Port

- Retry Policy

- Max Attempt

- Audit Log DB

FIG. 7

INTELLIGENT MESSAGE LOSS DETECTION AND REMEDIATION IN A MICROSERVICES ARCHITECTURE

BACKGROUND

Use of cloud native and microservices technologies are becoming more common. Cloud native computing is a software development approach that utilizes cloud computing to create scalable applications within dynamic environments such as cloud or cloud-like computing environments. Common in cloud native computing architectures are microservices. Microservices (or microservices architecture) are a cloud native architectural approach in which a single application is composed of many loosely coupled and independently deployable smaller components, or services. These services typically have their own technology stack, inclusive of the database and data management model. A distributed application is composed of hundreds of microservices which communicate with each other using a synchronous protocol, such as the Hypertext Transfer Protocol (HTTP), or using an asynchronous protocol, such as the Advanced Message Queuing Protocol (AMQP).

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

The backbone of a microservices architecture is the payload or the message body which forms the information for data exchange. The ability to exchange messages within the microservices architecture is critically important since lost or failed messages can result in both business loss and untraceable application errors. Protocols, such as HTTP, define the use of status codes to assist in the proper delivery and processing of messages. However, HTTP status codes such as 2xx, 3xx, 4xx, and 5xx are only helpful to the extent of determining what happened at the receiving end, such as whether the message was received by the recipient, failed at the server side, or encountered any network errors. Unfortunately, these status codes are of no help in determining whether messages received by the recipient are successfully processed. For example, a message may fail subsequent to the recipient sending back an HTTP status 200 OK indicating successful receipt of the message. In such cases, the sender may not know of the message failure or whether to resend the payload. Embodiments of the present disclosure provide solutions to these and other technical problems described herein.

In accordance with one illustrative embodiment provided to illustrate the broader concepts, systems, and techniques described herein, a method includes, by a computing device, intercepting a request message from a first microservice to a second microservice, saving information about the request message to a first database, and initiating a timer for the request message, wherein the timer specifies a predetermined time for retrying the request message. The method also includes, by the computing device, responsive to a determination that the timer expired, incrementing a current attempt count for the request message, wherein the current attempt count is a count of a number of times the request message is retried, and, responsive to a determination that the current attempt count does not exceed a maximum attempts permitted for the request message, retrieving the information about the request message from the first database, retrying the request message based on the information retrieved from the first database, and initiating the timer for the request message. The method further includes, responsive to a determination that the current attempt exceeds the maximum attempts permitted for the request message, by the computing device, saving information about the request message to a second database.

In some embodiments, the information about the request message includes a recipient of the request message, a payload, and a type of request message. In one aspect, the information about the request message includes a target Uniform Resource Identifier (URI), a payload, and a Hypertext Transfer Protocol (HTTP) method.

In some embodiments, the first database is an in-memory database.

In some embodiments, retrying the request message includes initiating the timer for the request message.

In some embodiments, the method also includes, by the computing device, responsive to the determination that the current attempt exceeds the maximum attempts permitted for the request message, setting a purge flag for the request message to indicate that the information about the request message can be permanently deleted from the first database.

In some embodiments, the method further includes, responsive to a determination that an acknowledgement signal for a request identifier associated with the request message is intercepted, by the computing device, stopping the timer for the request message and stopping the timer for the request message.

In some embodiments, the method also includes, by the computing device, purging information about the request message from the first database based on the purge flag for the request message.

In some embodiments, the computing device is a sidecar proxy deployed adjacent to the first microservice.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to carry out a process corresponding to the aforementioned method or any described embodiment thereof.

According to another illustrative embodiment provided to illustrate the broader concepts described herein, a non-transitory machine-readable medium encodes instructions that when executed by one or more processors cause a process to be carried out, the process corresponding to the aforementioned method or any described embodiment thereof.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims appended hereto.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 6 is a diagram illustrating an in-memory database record, in accordance with an embodiment of the present disclosure.

FIG. 7 is a diagram illustrating an intelligent message loss detection (IMLD) settings data structure, in accordance with an embodiment of the present disclosure.

DETAILED DESCRIPTION

Figure 1:
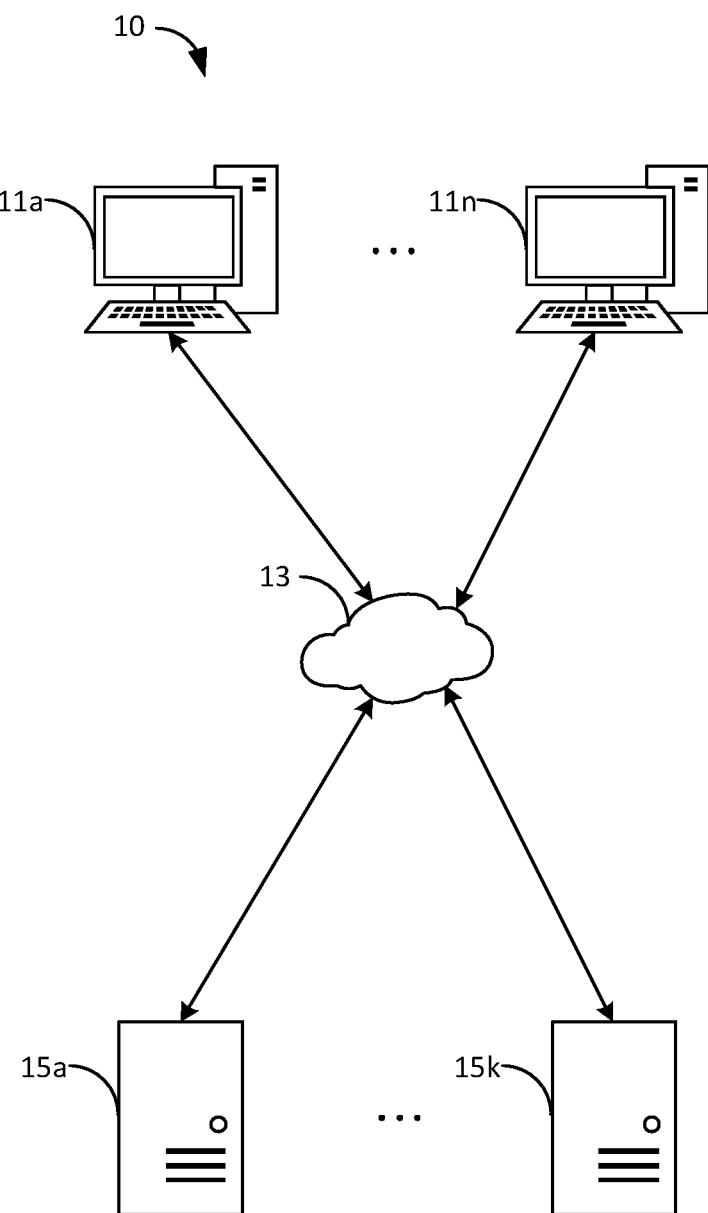
FIG. 1 is a diagram illustrating an example network environment of computing devices in which various aspects of the disclosure may be implemented, in accordance with an embodiment of the present disclosure.

Referring now to FIG. 1, shown is a diagram illustrating an example network environment 10 of computing devices in which various aspects of the disclosure may be implemented, in accordance with an embodiment of the present disclosure. As shown, environment 10 includes one or more client machines 11a-11n (11 generally), one or more server machines 15a-15k (15 generally), and one or more networks 13. Client machines 11 can communicate with server machines 15 via networks 13. Generally, in accordance with client-server principles, a client machine 11 requests, via network 13, that a server machine 15 perform a computation or other function, and server machine 15 responsively fulfills the request, optionally returning a result or status indicator in a response to client machine 11 via network 13.

In some embodiments, client machines 11 can communicate with remote machines 15 via one or more intermediary appliances (not shown). The intermediary appliances may be positioned within network 13 or between networks 13. An intermediary appliance may be referred to as a network interface or gateway. In some implementations, the intermediary appliance may operate as an application delivery controller (ADC) in a datacenter to provide client machines (e.g., client machines 11) with access to business applications and other data deployed in the datacenter. The intermediary appliance may provide client machines with access to applications and other data deployed in a cloud computing environment, or delivered as Software as a Service (SaaS) across a range of client devices, and/or provide other functionality such as load balancing, etc.

Client machines 11 may be generally referred to as computing devices 11, client devices 11, client computers 11, clients 11, client nodes 11, endpoints 11, or endpoint nodes 11. Client machines 11 can include, for example, desktop computing devices, laptop computing devices, tablet computing devices, mobile computing devices, workstations, and/or hand-held computing devices. Server machines 15 may also be generally referred to as a server farm 15. In some embodiments, a client machine 11 may have the capacity to function as both a client seeking access to resources provided by server machine 15 and as a server machine 15 providing access to hosted resources for other client machines 11.

Server machine 15 may be any server type such as, for example, a file server, an application server, a web server, a proxy server, a virtualization server, a deployment server, a Secure Sockets Layer Virtual Private Network (SSL VPN) server; an active directory server; a cloud server; or a server executing an application acceleration program that provides firewall functionality, application functionality, or load balancing functionality. Server machine 15 may execute, operate, or otherwise provide one or more applications. Non-limiting examples of applications that can be provided include software, a program, executable instructions, a virtual machine, a hypervisor, a web browser, a web-based client, a client-server application, a thin-client, a streaming application, a communication application, or any other set of executable instructions.

In some embodiments, server machine 15 may execute a virtual machine providing, to a user of client machine 11, access to a computing environment. In such embodiments, client machine 11 may be a virtual machine. The virtual machine may be managed by, for example, a hypervisor, a virtual machine manager (VMM), or any other hardware virtualization technique implemented within server machine 15.

Networks 13 may be configured in any combination of wired and wireless networks. Network 13 can be one or more of a local-area network (LAN), a wide area network (WAN), a metropolitan area network (MAN), a virtual private network (VPN), a primary public network, a primary private network, the Internet, or any other type of data network. In some embodiments, at least a portion of the functionality associated with network 13 can be provided by a cellular data network and/or mobile communication network to facilitate communication among mobile devices. For short range communications within a wireless local-area network (WLAN), the protocols may include 802.11, Bluetooth, and Near Field Communication (NFC).

Figure 2:
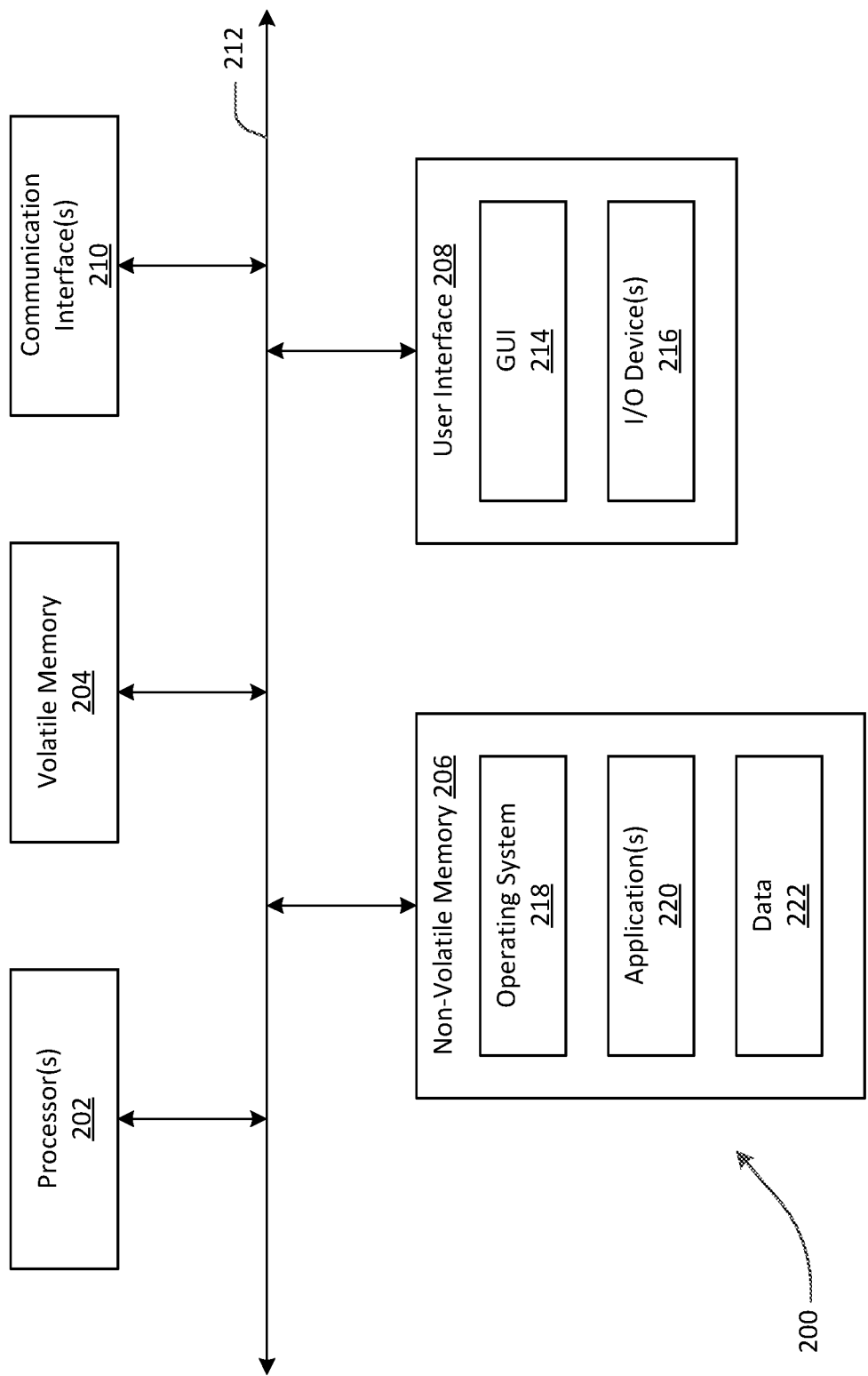
FIG. 2 is a block diagram illustrating selective components of an example computing device in which various aspects of the disclosure may be implemented, in accordance with an embodiment of the present disclosure.

FIG. 2 is a block diagram illustrating selective components of an example computing device 200 in which various aspects of the disclosure may be implemented, in accordance with an embodiment of the present disclosure. For instance, client machines 11 and/or server machines 15 of FIG. 1 can be substantially similar to computing device 200. As shown, computing device 200 includes one or more processors 202, a volatile memory 204 (e.g., random access memory (RAM)), a non-volatile memory 206, a user interface (UI) 208, one or more communications interfaces 210, and a communications bus 212.

Non-volatile memory 206 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 208 may include a graphical user interface (GUI) 214 (e.g., a touchscreen, a display, etc.) and one or more input/output (I/O) devices 216 (e.g., a mouse, a keyboard, a microphone, one or more speakers, one or more cameras, one or more biometric scanners, one or more environmental sensors, and one or more accelerometers, etc.).

Non-volatile memory 206 stores an operating system 218, one or more applications 220, and data 222 such that, for example, computer instructions of operating system 218 and/or applications 220 are executed by processor(s) 202 out of volatile memory 204. In one example, computer instructions of operating system 218 and/or applications 220 are executed by processor(s) 202 out of volatile memory 204 to perform all or part of the processes described herein (e.g., processes illustrated and described with reference to FIGS. 4 through 7). In some embodiments, volatile memory 204 may include one or more types of RAM and/or a cache memory that may offer a faster response time than a main memory. Data may be entered using an input device of GUI 214 or received from I/O device(s) 216. Various elements of computing device 200 may communicate via communications bus 212.

The illustrated computing device 200 is shown merely as an illustrative client device or server and may be implemented by any computing or processing environment with any type of machine or set of machines that may have suitable hardware and/or software capable of operating as described herein.

Processor(s) 202 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 202 may be analog, digital, or mixed signal. In some embodiments, processor 202 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 210 may include one or more interfaces to enable computing device 200 to access a computer network such as a Local Area Network (LAN), a Wide Area Network (WAN), a Personal Area Network (PAN), or the Internet through a variety of wired and/or wireless connections, including cellular connections.

In described embodiments, computing device 200 may execute an application on behalf of a user of a client device. For example, computing device 200 may execute one or more virtual machines managed by a hypervisor. Each virtual machine may provide an execution session within which applications execute on behalf of a user or a client device, such as a hosted desktop session. Computing device 200 may also execute a terminal services session to provide a hosted desktop environment. Computing device 200 may provide access to a remote computing environment including one or more applications, one or more desktop applications, and one or more desktop sessions in which one or more applications may execute.

Figure 3:
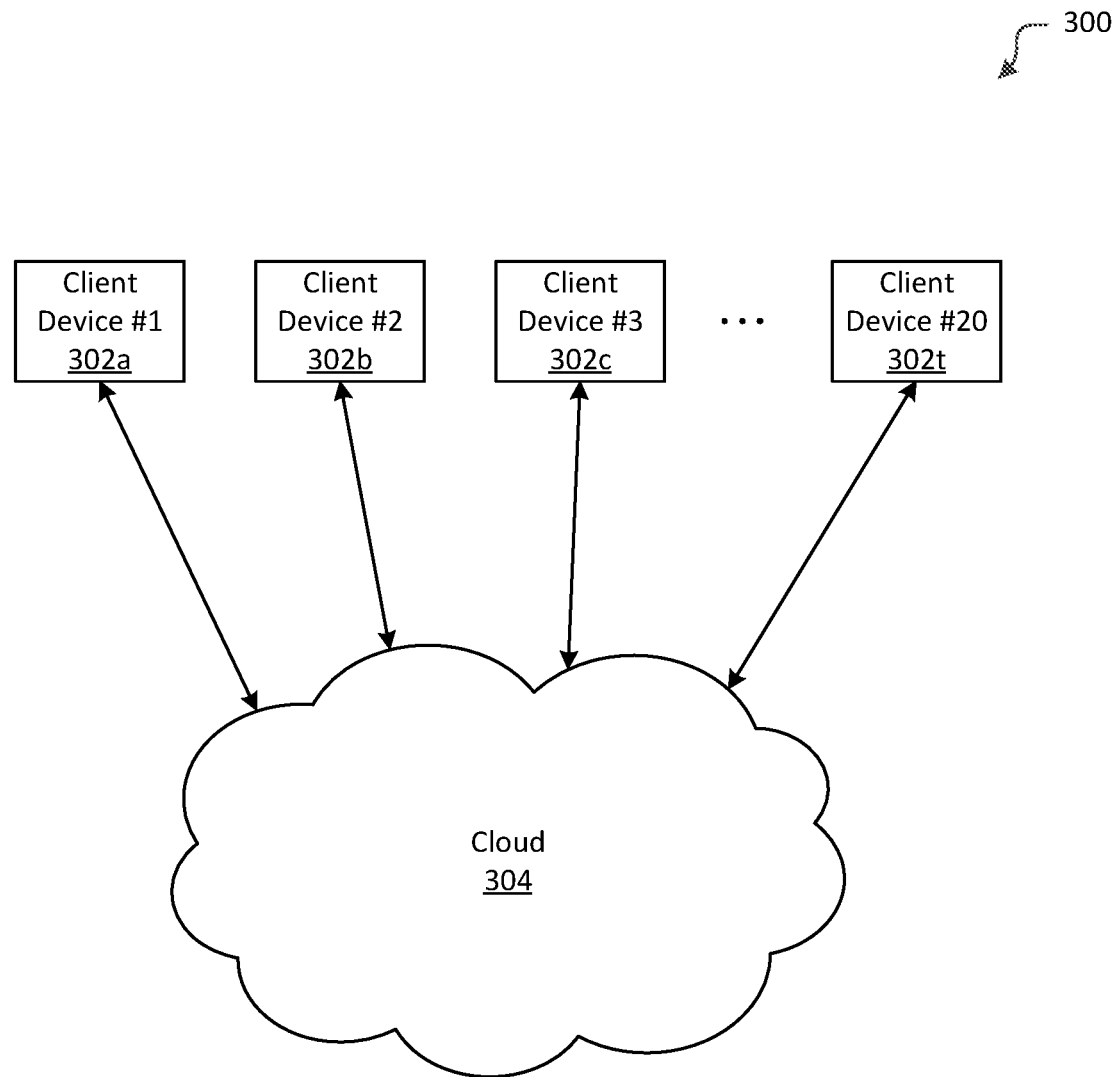
FIG. 3 is a diagram of a cloud computing environment in which various aspects of the concepts described herein may be implemented.

Referring to FIG. 3, shown is a diagram of a cloud computing environment 300 in which various aspects of the concepts described herein may be implemented. Cloud computing environment 300, which may also be referred to as a cloud environment, cloud computing, or cloud network, can provide the delivery of shared computing resources and/or services to one or more users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more client devices 302a-302t (such as client machines 11 and/or computing device 200 described above) may be in communication with a cloud network 304 (sometimes referred to herein more simply as a cloud 304). Cloud 304 may include back-end platforms such as, for example, servers, storage, server farms, or data centers. The users of clients 302a-302t can correspond to a single organization/tenant or multiple organizations/tenants. More particularly, in one implementation, cloud computing environment 300 may provide a private cloud serving a single organization (e.g., enterprise cloud). In other implementations, cloud computing environment 300 may provide a community or public cloud serving one or more organizations/tenants.

In some embodiments, one or more gateway appliances and/or services may be utilized to provide access to cloud computing resources and virtual sessions. For example, a gateway, implemented in hardware and/or software, may be deployed (e.g., reside) on-premises or on public clouds to provide users with secure access and single sign-on to virtual, SaaS, and web applications. As another example, a secure gateway may be deployed to protect users from web threats.

In some embodiments, cloud computing environment 300 may provide a hybrid cloud that is a combination of a public cloud and a private cloud. Public clouds may include public servers that are maintained by third parties to client devices 302a-302t or the enterprise/tenant. The servers may be located off-site in remote geographical locations or otherwise.

Cloud computing environment 300 can provide resource pooling to serve clients devices 302a-302t (e.g., users of client devices 302a-302n) through a multi-tenant environment or multi-tenant model with different physical and virtual resources dynamically assigned and reassigned responsive to different demands within the respective environment. The multi-tenant environment can include a system or architecture that can provide a single instance of software, an application, or a software application to serve multiple users. In some embodiments, cloud computing environment 300 can include or provide monitoring services to monitor, control, and/or generate reports corresponding to the provided shared resources and/or services.

In some embodiments, cloud computing environment 300 may provide cloud-based delivery of various types of cloud computing services, such as Software as a service (SaaS), Platform as a Service (PaaS), Infrastructure as a Service (IaaS), and/or Desktop as a Service (DaaS), for example. IaaS may refer to a user renting the use of infrastructure resources that are needed during a specified period. IaaS providers may offer storage, networking, servers, or virtualization resources from large pools, allowing the users to quickly scale up by accessing more resources as needed.

PaaS providers may offer functionality provided by IaaS, including, e.g., storage, networking, servers, or virtualization, as well as additional resources such as, for example, operating systems, middleware, and/or runtime resources. SaaS providers may offer the resources that PaaS provides, including storage, networking, servers, virtualization, operating systems, middleware, or runtime resources. SaaS providers may also offer additional resources such as, for example, data and application resources. DaaS (also known as hosted desktop services) is a form of virtual desktop service in which virtual desktop sessions are typically delivered as a cloud service along with the applications used on the virtual desktop.

Figure 4:
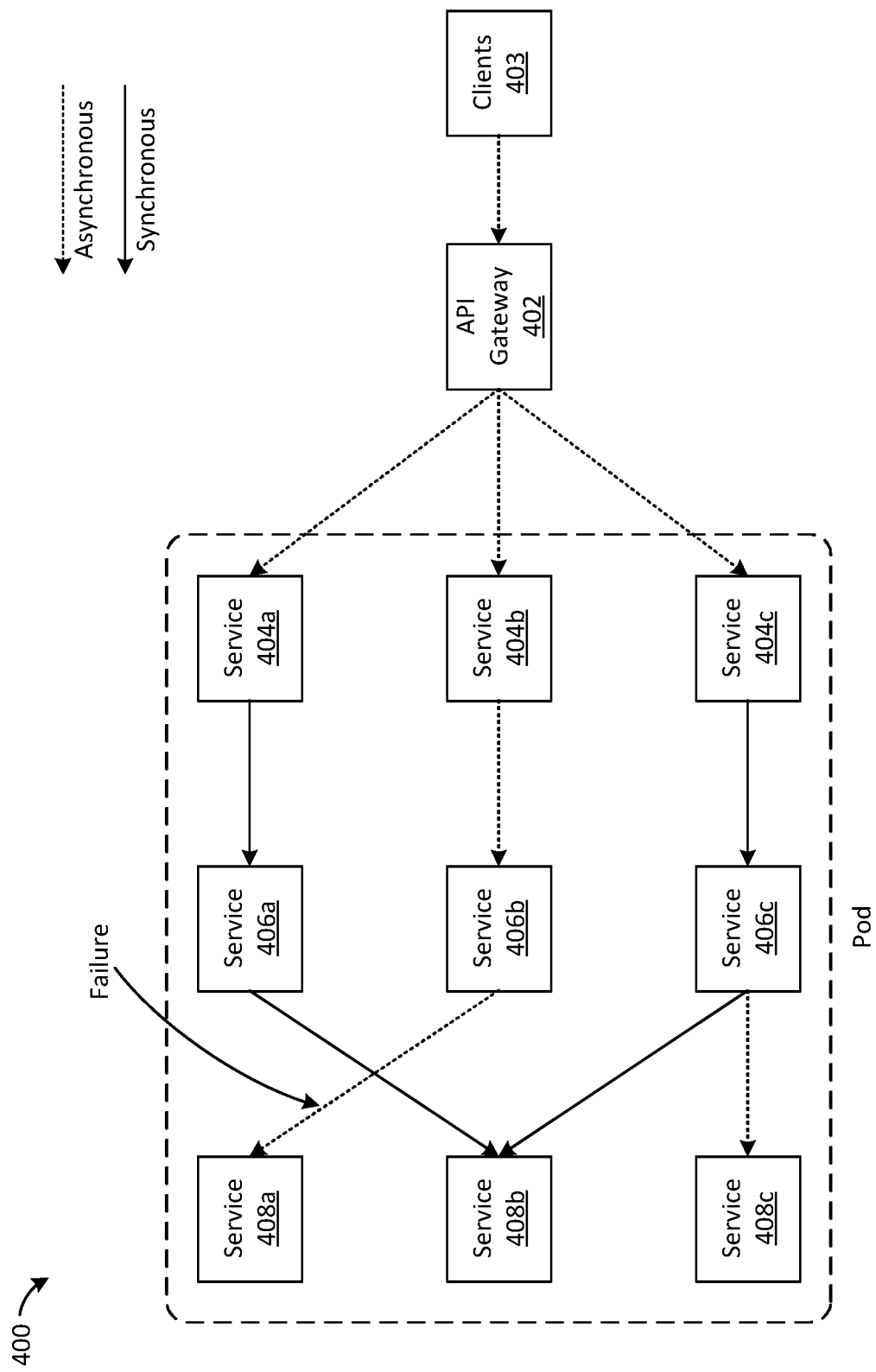
FIG. 4 illustrates a microservices environment in which messages can be sent and received.

FIG. 4 illustrates a microservices environment 400 in which messages can be sent and received. Microservices environment 400 may correspond to, for example, a microservice ecosystem in which both a synchronous protocol (e.g., HTTP) and an asynchronous protocol (e.g., AMPQ) can be used. An API gateway 402 may be receiving messages (e.g., purchase orders) from one or more clients 403. API gateway 402 may perform some initial validation on the payloads and return success messages (e.g., HTTP status 200 OK) to the one or more clients 403 indicating successful receipt of the messages. Upon returning the success messages, API gateway 402 may pass (e.g., send) the messages to services 404a, 404b, 404c asynchronously. Each of the services 404a, 404b, 404c may perform some initial validation on the payload and return a success message to API gateway 402. Upon returning the success message to API gateway 402, service 404a may synchronously pass the message to a service 406a and wait to receive a response (other than a message successfully received response) to the sent message from service 406a. Upon receiving the message from service 404a, service 406a may synchronously pass the message to a service 408b and wait to receive a response (other than a message successfully received response) to the sent message from service 408b.

Upon returning the success message to API gateway 402, service 404b may asynchronously pass the message to a service 406b. Upon performing some initial validation on the payload and returning a success message to service 404b, service 406b may asynchronously pass the message to a service 408a. Similarly, upon returning the success message to API gateway 402, service 404c may synchronously pass the message to a service 406c and wait to receive a response (other than a message successfully received response) to the sent message from service 406c. Upon receiving the message from service 404c, service 406c may synchronously pass the message to service 408b and wait to receive a response (other than a message successfully received response) to the sent message from service 408b. Service 406c may also asynchronously pass the message to a service 408c. However, as can be seen in FIG. 4, the asynchronous message from service 406b to service 408a may fail and, thus, be effectively lost. Messages in environment 400 may be lost for various reasons, such as, for example, network failure, receiver system (e.g., service 408a) not available, receiver system (e.g., service 408a) failed to process the message, and sender system (e.g., service 408a) failed to pass (or "push") the message, among other causes for message failure. As will be described in further detail below, embodiments of the present disclosure can detect and remediate lost (i.e., failed) messages in a microservices architecture.

Figure 5:
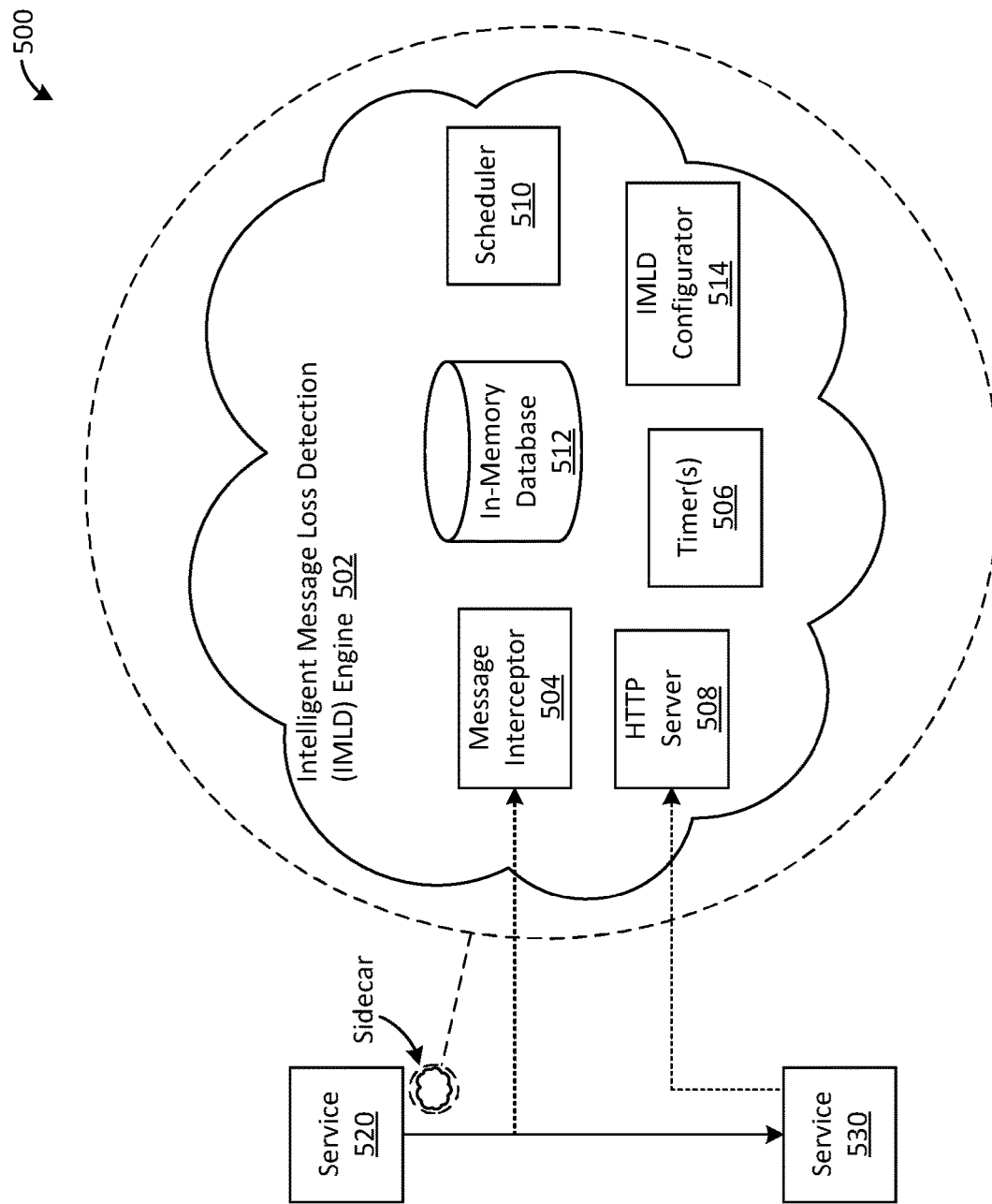
FIG. 5 is a block diagram of an illustrative network environment for message loss detection and remediation, in accordance with an embodiment of the present disclosure.

FIG. 5 is a block diagram of an illustrative network environment 500 for message loss detection and remediation, in accordance with an embodiment of the present disclosure. As illustrated, network environment 500 may include an intelligent message loss detection (IMLD) engine 502, a service 520, and a service 530. Services 520, 530 may correspond to microservices within a microservices environment. For example, services 520, 530 may be based on cloud-native application architectures and/or applications that run on container-based orchestration platforms such as KUBERNETES and DOCKER. In the example of FIG. 5, IMLD engine 502 includes a message interceptor 504, one or more timers 506, a HTTP server 508, a scheduler 510, an in-memory database 512, and an IMLD configurator 514.

In some embodiments, IMLD engine 502 can be provided as a service (e.g., a microservice) within network environment 500 (e.g., within the microservices environment of services 520, 530). IMLD engine 502 may be, according to some embodiments, configured to deploy sidecar proxies (or "sidecars") to microservices that register for enabling the IMLD service provided by IMLD engine 502. IMLD engine 502 may also be enabled for a namespace in a cluster, such as a KUBERNETES cluster, in which case IMLD engine 502 is automatically registered for all the microservices running inside that namespace. In the example of FIG. 5, service 520 may enable the IMLD service and IMLD engine 502 may automatically deploy a sidecar for service 520. That is, IMLD engine 502 may run as a sidecar attached to service 520.

Referring to IMLD engine 502, message interceptor 504 is operable to monitor the network traffic and intercept and capture information about request messages (e.g., outgoing calls) being sent by a microservice to which a sidecar of IMLD engine 502 is attached. Such intercepted request messages can be understood to be potentially lost messages. In one implementation, message interceptor 504 may be configured to run as a request and response interceptor (e.g., HTTP or asynchronous protocol such as AMQP) collecting all the information a sender microservice sends to a receiving microservice endpoint. Message interceptor 504 can save the captured information per request/response to in-memory database 512. In one implementation, for a particular intercepted request message, message interceptor 504 can set a timer 506 (e.g., an instance of timer 506) for the request identifier of the request message to the waiting time for the acknowledgement signal from the receiving microservice (i.e., from the microservice that received the intercepted request message) and initiate the set timer 506. The waiting time for the acknowledgement signal may be specified in a retry policy. In the example of FIG. 5, message interceptor 504 may monitor the network traffic and intercept a request message (e.g., HTTP request) being sent by service 520 to service 530. Message interceptor 504 may then save the information about the intercepted request message to in-memory database 512 and set and initiate a timer 506 for the request identifier of the intercepted request message to service 530. Timer 506 initiated for the request identifier may be set to the waiting time for the acknowledgement signal as specified in the retry policy for the intercepted request message. Note that service 520 sending request messages to service 530 is merely a simple example and that, in practice, service 520 is likely to send request messages to other services and, in some cases, many other services in addition to service 530, and message interceptor 504 is operable to intercept and capture information about all outgoing request messages from service 520.

Timers 506 can correspond to timer instances initiated for each intercepted request message. An instance of timer 506 can be initiated for a request identifier of an intercepted request message. Instances of timer 506 can be set to waiting times for acknowledgement signals as specified in the retry policy.

HTTP server 508 is operable to intercept acknowledgement signals for request messages intercepted by message interceptor 504. For example, HTTP server 508 can listen on a port (e.g., port 9090) for an incoming acknowledgement signal from a receiving microservice. The port that HTTP server 508 is to listen on may be specified as part of an IMLD policy. In one implementation, upon intercepting (e.g., receiving) an acknowledgement signal for a request identifier of an intercepted request message, HTTP server 508 can stop the timer 506 instance initiated for that request identifier. In the example of FIG. 5, HTTP server 508 may listen on port 9090 for an incoming acknowledgement signal from service 530 for the request identifier of the request message sent by service 520. If an acknowledgement signal for the request identifier of the request message sent by service 520 is intercepted, HTTP server 508 can stop the timer 506 instance that was initiated for that request identifier.

Scheduler 510 is operable to attempt retries of intercepted request messages based on the retry policy. According to one implementation, for a particular intercepted request message, scheduler 510 can first determine whether the request message can be retried (e.g., replayed) based on the number of retries already attempted and the maximum number of retries permitted for the request message. To retry the request message, scheduler 510 can retrieve or query in-memory database 512 the information needed to retry the request message, such as the request identifier, the payload of the request message, and the type of request message. Scheduler 510 can then create the request message that is to be retried and trigger a job to make a retry call to the receiving microservice for the particular request message (e.g., trigger a job to retry the created request message). Scheduler 510 can then set a timer 506 for the request identifier of the request message (i.e., the request identifier of the retried message) to the waiting time for the acknowledgement signal from the receiving microservice as specified in the retry policy and initiate the set timer 506.

In-memory database 512 is operable to store the information and details about intercepted request messages. In-memory database 512 may implement or include a purpose-built database that primarily relies on memory (i.e., non-disk) for data storage. As a result, in-memory database 512 is faster and more efficient in execution and requires fewer CPU instructions to retrieve data as compared to legacy databases (e.g., as compared to databases that store data on disk storage or SSDs). In some embodiments, in-memory database 512 may be configured to purge records storing information about intercepted request messages that have completed processing either successfully (e.g., acknowledgement signals were intercepted) or by exhausting their permitted number of retries per the retry policy. Purging records from in-memory database 512 in this way enables in-memory database 512 to maintain a smaller digital footprint (i.e., utilize less memory and, thus, be more efficient). According to one implementation, in-memory database 512 may be configured to perform the purging of records storing information about intercepted request messages that have completed processing on a continuous or periodic basis (e.g., according to a predetermined schedule which may be configured as part of the IMLD policy).

In some embodiments, in-memory database 512 may be configured to store the information from the purged records within an audit log database, where it can be subsequently retrieved and used. Such information stored within the audit log database may indicate whether retries of the intercepted request messages were successful or unsuccessful. In some embodiments, the audit log database may correspond to a database that stores data on disk storage or SSDs instead of memory.

In some embodiments, in-memory database 512 may be implemented as a key-value based document database configured to store the information about intercepted request messages in corresponding records in the database. In-memory database 512 is further described below at least with respect to FIG. 6.

IMLD configurator 514 can be used to configure (e.g. setup) IMLD engine 502. To this end, IMLD configurator 514 may provide an interface for configuring various settings to control various aspects of the operation of IMLD engine 502. In some embodiments, IMLD configurator 514 may maintain microservice and namespace registration information including the names of all the microservices and namespaces for which IMLD engine 502 needs to be enabled. The microservice and namespace registration information can be used to automatically register IMLD engine 502 (i.e., the sidecar of IMLD engine 502) for the microservices and/or namespaces in a cluster. The IMLD settings are further described below at least with respect to FIG. 7.

Further description of the components of IMLD engine 502 and other processing that can be implemented within IMLD engine 502 is provided below with at least with respect to FIG. 8.

Turning to FIG. 6 and with continued reference to FIG. 5, shown is a diagram illustrating an in-memory database record 600, in accordance with an embodiment of the present disclosure. In-memory database record 600 may correspond to a record in in-memory database 512 and can be used to store information about a request message sent from a sending microservice to a receiving microservice. As previously discussed, message interceptor 504 of IMLD engine 502 may store information about an intercepted request message to in-memory database 512. In particular, according to one embodiment, the information about an intercepted request message may be stored within a particular in-memory database record 600.

In the example shown in FIG. 6, in-memory database record 600 includes a "Request_Id" attribute, a "Target_Uri" attribute, a "Message_Payload" attribute, a "HTTP_Method" attribute, a "Current_Attempt" attribute, a "Status" attribute, and a "Purge" attribute. The "Request_Id" attribute uniquely identifies the request message whose information is stored within the particular in-memory database record 600 (e.g., uniquely identifies the request message associated with the particular in-memory database record 600). For example, the "Request_Id" attribute may be a RequestID that uniquely identifies a HTTP request. The "Target_Uri" attribute indicates a recipient of the request message. For example, the "Target_Uri" may be a target Uniform Resource Identifier (URI) for a HTTP message. The "Message_Payload" attribute includes the payload of the request message (e.g., the data included in the request message). The "HTTP_Method" attribute indicates the type of request message. For example, the "HTTP_Method" may be a HTTP Method such as GET, POST, PUT, etc.

The "Max_Attempts" attribute indicates the maximum number of times the request message can be retried (e.g., the maximum number of times the request message can be resent). The "Max_Attempts" attribute may be predetermined for the request message based on a defined policy (e.g., a retry policy). The "Current_Attempt" attribute indicates the number of retries attempted for the request message. For example, the "Current_Attempt" attribute can be incremented each time a retry is attempted for the request messages (e.g., each time the request message is resent). The "Status" attribute indicates the current status of the request message. For example, the "Status" attribute may indicate the type of response the request message is waiting to receive (e.g., "WAITING_ON_ACK"). The "Purge" attribute indicates whether the particular in-memory database record 600 can be purged from in-memory database 512 (e.g., permanently deleted in in-memory database 512 so as to free up memory). For example, the "Purge" attribute may be implemented as a flag which can be set to "TRUE" to indicate that the particular in-memory database record 600 can be purged, or "FALSE" to indicate that the particular in-memory database record 600 is not to be purged. In one implementation, the "Purge" attribute may be set to "FALSE" by default.

In embodiments, IMLD engine 502 and, more particularly, scheduler 510 of IMLD engine 502 can use the information stored within in-memory database records 600 to determine whether request messages (e.g., intercepted request messages) are to be retried. Scheduler 510 can also use the information stored within in-memory database records 600 to create (e.g., recreate) the request messages which are to be retried. The attributes shown in in-memory database record 600 are merely illustrative and is not intended to depict a complete list of attributes of in-memory database record 600. For example, in practice, in-memory database record 600 may include various other attributes and/or not include some of the attributes shown in FIG. 6.

Turning to FIG. 7 and with continued reference to FIG. 5, shown is a diagram illustrating an intelligent message loss detection (IMLD) settings data structure 700, in accordance with an embodiment of the present disclosure. The illustrated IMLD settings data structure 700 may store the various setting for configuring and customizing the operation of IMLD engine 502. In the example shown in FIG. 7, IMLD settings data structure 700 includes setting for "Enable/Disable Pod," "Enable/Disable Namespace," "DNS Entry," "Listener Port," "Retry," "Max_Attempts," and "Audit Log DB."

The "Enable/Disable Pod" setting can be provided for the individual pods and can be used to specify whether IMLD engine 502 (i.e., the IMLD service) is to be enabled or disabled for the particular pod running a microservice. For instance, as discussed previously, a sidecar of IMLD engine 502 can attach to a microservice (e.g., attach to a microservice that registers for the IMLD service). In cases where the microservice is running on multiple pods, the individual pods on which the microservice is running will need its own sidecar. That is, for IMLD engine 502 to be enabled on the multiple pods on which the microservice is running (i.e., the multiple pods running the microservice), a sidecar of IMLD engine 502 needs to be attached to each of the multiple pods. The "Enable/Disable Pod" settings can be used to specify whether IMLD engine 502 is to be enabled or disabled for a particular pod on which a registered microservice (i.e., a microservice that registered for the IMLD service) is running.

The "Enable/Disable Namespace" setting can be provided for the individual namespaces and can be used to specify whether IMLD engine 502 (i.e., the IMLD service) is to be enabled or disabled for the particular namespace in a cluster, such as a KUBERNETES cluster. If the "Enable/Disable Namespace" setting is enabled for a particular namespace, the IMLD service is automatically registered for all the microservices under that namespace. That is, if the "Enable/Disable Namespace" setting is enabled for a particular namespace, IMLD engine 502 is enabled for all the microservices under that namespace. The "DNS Entry" setting can be used to specify a DNS entry for the HTTP server (e.g., HTTP server 508) that is listening for the incoming acknowledgment signals. The "Listener Port" setting can be used to specify the port that the HTTP server (e.g., HTTP server 508) is to listen on for incoming acknowledgement signals.

The "Retry Policy" setting can be used to specify the retry policy that is to be applied in attempting to retry intercepted request messages. The retry policy may include information such as, for example, the number of retries to attempt for an intercepted request message and the waiting time for the acknowledgement signal (i.e., the timeout wait period) for an intercepted request message before a retry is to be attempted, among other information. In some implementations, a different number of retries may be specified for different types of request messages. In some implementations, increasingly longer waiting times for the acknowledgement signal may be specified (e.g., exponential backoff) based on the number of retries already attempted for an intercepted request message. For example, the retry policy may specify a timeout wait period of 10 minutes for a first retry attempt, a timeout wait period of 30 minutes for a second retry attempt, a time out wait period of 120 minutes for a third retry attempt, and a timeout wait period of 240 minutes for a fourth retry attempt. The "Max Attempts" setting can be used to specify a maximum number of retries that are to be attempted for an intercepted request message. The "Audit Log DB" setting specifies a connection string for the audit log database. That is, the "Audit Log DB" setting specifies the information needed to establish a connection to the audit log database. The settings shown in data structure 700 are merely illustrative and are not intended to depict a complete list of the IMLD settings for IMLD engine 502.

Figure 8:
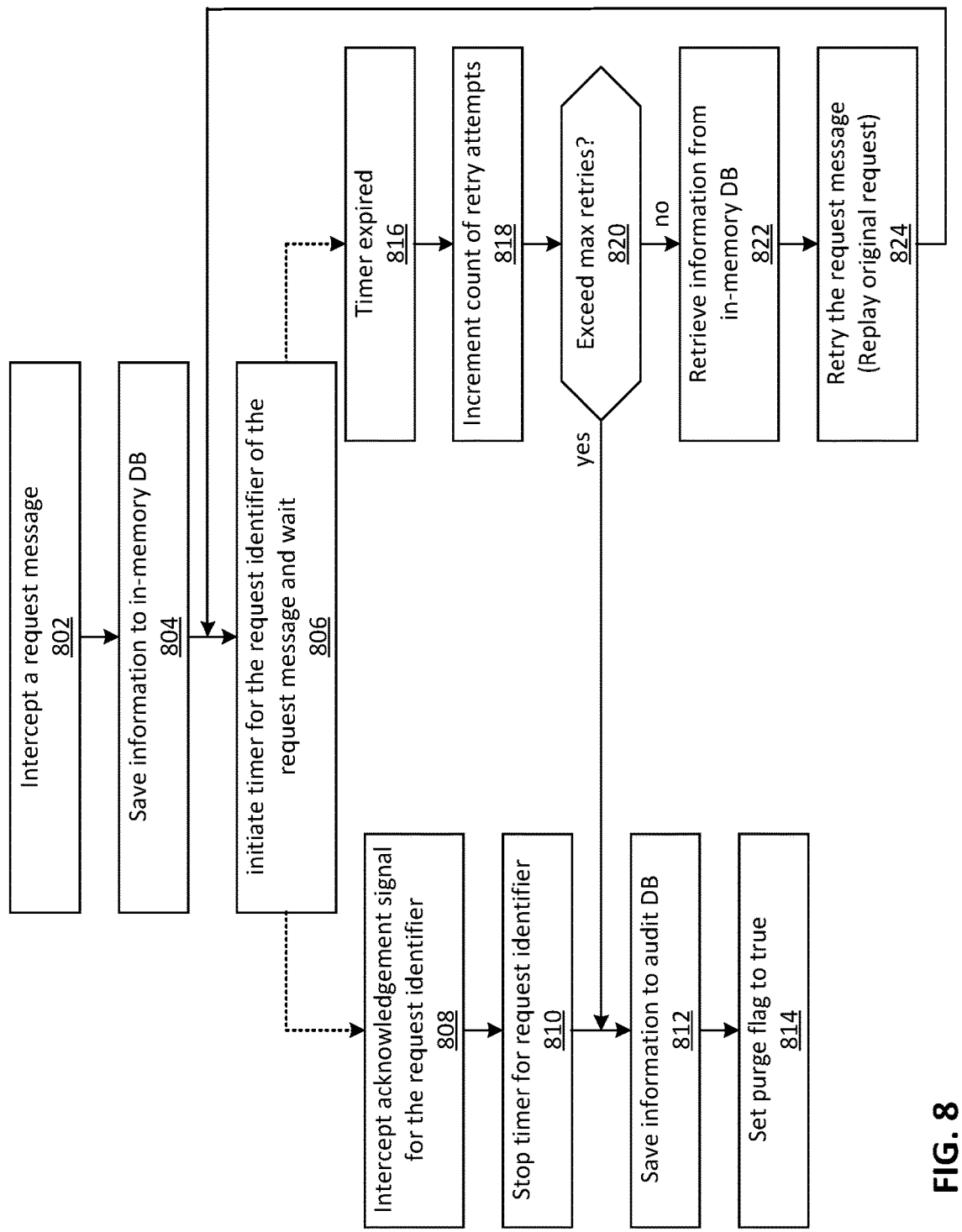
FIG. 8 is a flow diagram of an example process for detecting and remediating lost messages, in accordance with an embodiment of the present disclosure.

FIG. 8 is a flow diagram of an example process 800 for detecting and remediating lost or unprocessed messages, in accordance with an embodiment of the present disclosure. Illustrative process 800 may be implemented, for example, within IMLD engine 502 of FIG. 5. For purposes of this discussion, it is assumed that a sidecar of IMLD engine 502 is attached to a Microservice A, and that Microservice A is sending a request message having a request identifier RID123 to a Microservice B.

With reference to process 800, at 802, a request message may be intercepted. For example, message interceptor 504 may intercept the request message having request identifier RID123 sent by Microservice A.

At 804, information about the request message may be saved to a first database (e.g., an in-memory database). For example, message interceptor 504 may capture and save information about the request message having request identifier RID123 to in-memory database 512.

At 806, a timer for the request identifier of the request message may be initiated. Upon initiating the timer, process 800 may wait to intercept an acknowledgement signal for the request identifier of the request message or for expiration of the timer initiated for the request message. For example, message interceptor 504 or another component of IMLD engine 502 may set an instance of timer 506 for request identifier RID123 to the waiting time for the acknowledgement signal from Microservice B and initiate the set timer 506. Upon the set timer 506 for request identifier RID123 being initiated, message interceptor 504 may continue monitoring the network traffic for other request messages being sent by Microservice A.

At 808, an acknowledgement signal for the request identifier may be intercepted. For example, HTTP server 508 listening for acknowledgment signals may intercept an acknowledgment signal for request identifier RID123.

At 810, the timer initiated for the request identifier may be stopped. For example, upon intercepting the acknowledgment signal for request identifier RID123, HTTP server 508 may stop the timer 506 instance initiated for request identifier RID123. In some embodiments, IMLD engine 502 or another component of IMLD engine 502 may stop the timer 506 instance initiated for request identifier RID123.

At 812, the information about the request message may be saved to a second database (e.g., a database that stores data on disk storage or SSDs). For example, the information about the request message stored within the first database may be moved to the second database. For example, HTTP server 508 or another component of IMLD engine 502 may move the information about the request message having request identifier RID123 stored within in-memory database 512 to the audit log database.

At 814, the purge flag for the request message may be set to TRUE to indicate that the information about the request message saved in the first database can be purged. For example, upon moving the information to the audit log database, HTTP server 508 or another component of IMLD engine 502 may set the "Purge" attribute of the record in in-memory database 512 which stored the information about the request message having request identifier RID123 to TRUE.

However, prior to an acknowledgment signal for the request identifier being intercepted at 816, the timer initiated for the request identifier may expire. For example, the timer 506 instance initiated for request identifier RID123 may expire (i.e., timeout) prior to HTTP server 508 intercepting an acknowledgment signal for request identifier RID123.

At 818, the count of retry attempts for the request message may be incremented. For example, scheduler 510 may increment the "Current_Attempt" attribute of the record in in-memory database 512 storing the information about the request message having request identifier RID123.

At 820, a check may be performed to determine whether the number of retries attempted for the request message exceeds a maximum number of retries permitted for the request message. For example, scheduler 510 may check the "Current_Attempt" attribute and the "Max_Attempts" attribute of the record in in-memory database 512 storing the information about the request message having request identifier RID123 to determine whether the maximum number of retries permitted for the request message having request identifier RID123 is exceeded.

If, at 820, it is determined that the number of retries attempted for the request message does not exceed the maximum number of retries permitted for the request message, then, at 822, information about the request message may be retrieved from the first database. For example, if scheduler 510 determines that the maximum retries permitted for the request message having request identifier RID123, scheduler 510 may retrieve from in-memory database 512 the information stored about the request message having request identifier RID123. Scheduler 510 may then use the retrieved information to create the request message to retry (e.g., recreate the request message having request identifier TID123).

At 824, the request message may be retried. For example, scheduler 510 may schedule a job to resend the request message having request identifier RID123 created at 822. Scheduler 510 may then set an instance of timer 506 for request identifier RID123 to the waiting time for the acknowledgement signal from Microservice B and initiate the set timer 506.

Otherwise, if, at 820, it is determined that the number of retries attempted for the request message exceeds the maximum number of retries permitted for the request message, then, at 812, the information about the request message may be saved to the second database. For example, if scheduler 510 determines that the maximum retries permitted for the request message having request identifier RID123, scheduler 510 may move the information about the request message having request identifier RID123 stored within in-memory database 512 to the audit log database.

At 814, the purge flag for the request message may be set to TRUE to indicate that the information about the request message saved in the first database can be purged. For example, upon moving the information to the audit log database, scheduler 510 may set the "Purge" attribute of the record in in-memory database 512 which stored the information about the request message having request identifier RID123 to TRUE.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method comprising:
    intercepting, by a computing device, a request message from a first microservice to a second microservice;
    saving, by the computing device, information about the request message to a first database;
    initiating, by the computing device, a timer for the request message, wherein the timer specifies a predetermined time for retrying the request message;
    responsive to a determination that the timer expired, by the computing device:
        incrementing a current attempt count for the request message, wherein the current attempt count is a count of a number of times the request message is retried;
        responsive to a determination that the current attempt count does not exceed a maximum attempts permitted for the request message:
            retrieving the information about the request message from the first database;
            retrying the request message based on the information retrieved from the first database; and
            initiating the timer for the request message; and
        responsive to a determination that the current attempt exceeds the maximum attempts permitted for the request message, saving information about the request message to a second database; and
    responsive to a determination that an acknowledgement signal for a request identifier associated with the request message is intercepted, by the computing device:
        stopping the timer for the request message; and
        saving information about the request message to the second database.

2. The method of claim 1, wherein the information about the request message includes a recipient of the request message, a payload, and a type of request message.

3. The method of claim 1, wherein the first database is an in-memory database.

4. The method of claim 1, wherein retrying the request message includes initiating the timer for the request message.

5. The method of claim 1, further comprising, responsive to the determination that the current attempt exceeds the maximum attempts permitted for the request message, by the computing device, setting a purge flag for the request message to indicate that the information about the request message can be permanently deleted from the first database.

6. The method of claim 1, further comprising, responsive to a determination that an acknowledgement signal for a request identifier associated with the request message is intercepted, by the computing device, setting a purge flag for the request message to indicate that the request message can be permanently deleted from the first database.

7. The method of claim 6, further comprising purging, by the computing device, information about the request message from the first database based on the purge flag for the request message.

8. The method of claim 1, wherein the computing device is a sidecar proxy deployed adjacent to the first microservice.

9. A system comprising:
    one or more non-transitory machine-readable mediums configured to store instructions; and
    one or more processors configured to execute the instructions stored on the one or more non-transitory machine-readable mediums, wherein execution of the instructions causes the one or more processors to carry out a process comprising:
        intercepting a request message from a first microservice to a second microservice;
        saving information about the request message to a first database;

initiating a timer for the request message, wherein the timer specifies a predetermined time for retrying the request message;

responsive to a determination that the timer expired:

incrementing a current attempt count for the request message, wherein the current attempt count is a count of a number of times the request message is retried;

responsive to a determination that the current attempt count does not exceed a maximum attempts permitted for the request message:

retrieving the information about the request message from the first database;

retrying the request message based on the information retrieved from the first database; and initiating the timer for the request message; and responsive to a determination that the current attempt exceeds the maximum attempts permitted for the request message, saving information about the request message to a second database; and responsive to a determination that an acknowledgement signal for a request identifier associated with the request message is intercepted:

stopping the timer for the request message; and saving information about the request message to the second database.

10. The system of claim 9, wherein the information about the request message includes a target Uniform Resource Identifier (URI), a payload, and a Hypertext Transfer Protocol (HTTP) method.

11. The system of claim 9, wherein the first database is an in-memory database.

12. The system of claim 9, wherein retrying the request message includes initiating the timer for the request message.

13. The system of claim 9, wherein the process further comprises, responsive to the determination that the current attempt exceeds the maximum attempts permitted for the request message, setting a purge flag for the request message to indicate that the information about the request message can be permanently deleted from the first database.

14. The system of claim 9, wherein further comprising, responsive to a determination that an acknowledgement signal for a request identifier associated with the request message is intercepted, setting a purge flag for the request message to indicate that the request message can be permanently deleted from the first database.

15. The system of claim 14, wherein the process further comprises purging information about the request message from the first database based on the purge flag for the request message.

16. The system of claim 9, wherein the system is a sidecar proxy deployed adjacent to the first microservice.

17. A non-transitory machine-readable medium encoding instructions that when executed by one or more processors cause a process to be carried out, the process including:

intercepting a request message from a first microservice to a second microservice;

saving information about the request message to a first database, wherein the information about the request message includes a target Uniform Resource Identifier (URI), a payload, and a Hypertext Transfer Protocol (HTTP) method;

initiating a timer for the request message, wherein the timer specifies a predetermined time for retrying the request message;

responsive to a determination that the timer expired:

incrementing a current attempt count for the request message, wherein the current attempt count is a count of a number of times the request message is retried;

responsive to a determination that the current attempt count does not exceed a maximum attempts permitted for the request message:

retrieving the information about the request message from the first database;

retrying the request message based on the information retrieved from the first database; and initiating the timer for the request message; and responsive to a determination that the current attempt exceeds the maximum attempts permitted for the request message, saving information about the request message to a second database; and responsive to a determination that an acknowledgement signal for a request identifier associated with the request message is intercepted:

stopping the timer for the request message; and saving information about the request message to the second database.

* * * * *